United States Patent
Milov

(10) Patent No.: US 11,375,028 B1
(45) Date of Patent: Jun. 28, 2022

(54) UTILIZING NON-SERIALIZABLE OBJECTS WITH A FUNCTION AS A SERVICE PLATFORM

(71) Applicant: VMware, Inc., Palo Alto, CA (US)

(72) Inventor: Dimitar Milov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/144,219

(22) Filed: Jan. 8, 2021

(51) Int. Cl.
*H04L 41/22* (2022.01)
*H04L 67/63* (2022.01)
*H04L 67/02* (2022.01)
*H04L 67/51* (2022.01)
*H04L 67/00* (2022.01)

(52) U.S. Cl.
CPC .............. *H04L 67/16* (2013.01); *H04L 41/22* (2013.01); *H04L 67/02* (2013.01); *H04L 67/327* (2013.01); *H04L 67/34* (2013.01)

(58) Field of Classification Search
CPC ......... H04L 67/16; H04L 41/22; H04L 67/02; H04L 67/327; H04L 67/34
See application file for complete search history.

(56) References Cited

U.S. PATENT DOCUMENTS

| 7,814,124 B1* | 10/2010 | de Jong ................. G06F 9/4493 707/798 |
| 10,733,238 B2* | 8/2020 | Hussain .............. G06F 21/6218 |
| 2012/0210299 A1* | 8/2012 | Pasternak ............. G06F 9/4493 717/115 |
| 2013/0247003 A1* | 9/2013 | Seth ....................... G06F 9/4493 717/115 |

* cited by examiner

*Primary Examiner* — Andrew C Georgandellis
(74) *Attorney, Agent, or Firm* — Clayton, McKay & Bailey, PC

(57) ABSTRACT

Systems and methods are described for utilizing non-serializable object parameters with a function as a service ("FaaS") platform. A user can select, in a user interface of a web application, a server and a command for executing in a shell client. The web application can generate instructions for constructing an object in a shell client that corresponds to the server. The web application can retrieve a shell script associated with the selected command. The web application can send the instructions and shell script to a FaaS. The FaaS can execute, in a shell client, a script that constructs the object as a parameter in a shell session. In the same shell session, the FaaS can execute the shell script, causing the shell client to use the object as a parameter for the shell script.

20 Claims, 4 Drawing Sheets

UTILIZING NON-SERIALIZABLE OBJECTS WITH A FUNCTION AS A SERVICE PLATFORM

BACKGROUND

Serverless Computing (or simply "serverless") is emerging as a popular model for deploying software into production. Not to be confused with models that do not require a server to function, like peer-to-peer (P2P), serverless computing is a cloud-computing execution model in which the cloud provider runs the server and dynamically manages the allocation of machine resources. Many serverless vendors offer function as a service (FaaS) platforms, which execute application logic but do not store data. The usual approach for offering dynamic resource to run a function is to run container instances with the function definition and the function runtime on demand. Serverless providers usually support number of runtimes (Java, JavaScript, Python, C#) on which functions can run.

There is a demand for providing serverless execution of command-line and scripting clients built on PowerShell (hereinafter referred to as "shell clients"). Shell clients are built on MICROSOFT'S .NET framework, which allows the shell clients to run a specialized class of commands that output results as objects. The .NET framework also allows shell clients to use objects as input parameters. Shell clients are typically installed and run on the operating system of the user device. To provide a shell client as a FaaS, the scripts must be transmitted from the user device to a server that hosts the FaaS, such as with a Hypertext Transfer Protocol ("HTTP") request.

Objects, however, are not serializable and therefore can be neither stored nor transmitted and reconstructed. Because of this, a shell client script with object parameters cannot be sent to a FaaS platform.

As a result, a need exists for utilizing non-serializable object with a shell client FaaS platform.

SUMMARY

Examples described herein include systems and methods for utilizing non-serializable objects with a FaaS platform. In an example, a script execution service ("SES") on a server can receive a request to execute a script. The SES can be a FaaS platform that facilitates executing shell scripts server-side as opposed to client-side. The script can be a written for a shell client. A shell client can be an object-oriented interface for accessing services of an operating system. The shell client can be built on .NET framework, such as .NET Core. In an example, the shell client can be a PowerShell client or a PowerShell-based client, such as POWERCLI. In another example, the shell client can be LINUX or MACOS based, such as POWERSHELL CORE. Shell clients based on PowerShell can generate objects as outputs and use objects as input parameters.

In an example, the script can include serializable data that calls for a non-serializable object as a parameter. The serializable data can include text that can be transmitted over HTTP or similar protocols. In one example, the serializable data can include a name or identifier of a server with an operating system. A server can include virtual machines ("VM") or other devices with operating systems. In one example, the server can be part of an enterprise system. The serializable data can act as a placeholder for an object parameter.

In an example, the SES can also receive instructions for constructing the object. In one example, the instructions can include an argument transformation script. An argument transformation script can be a script that causes a shell client to query the operating system of a server for data necessary to create an object as a parameter, and then to construct the object as a parameter in a shell session. The instructions can also indicate what to name the object. For example, the instructions can indicate that the object should be constructed under an identifier that matches the text in the script that calls for an object parameter. That way, when the script is run in the same shell session, the shell client interprets the text as the object parameter.

In an example, the SES can execute the argument transformation script in the shell client. As explained above, executing the argument transformation script can cause the shell client to construct the object in the shell session. The SES can then execute the shell script in the shell client in the same session. Because the shell script is executed in the same session, the shell client can use the object as a parameter of the script.

In one example, the SES can receive the script and instructions from a web server. The web server can host a web application accessible to users via a web browser. The web application can include a user interface ("UI") that allows users to manage operating systems. In some examples, the UI can allow a user to perform certain actions respecting the operating systems. In one such example, users can upload shell scripts into the UI. In another such example, the UI can include predefined commands that a user can select. The predefined commands can be mapped to scripts stored in a library. Selecting a predefined command can cause the web application to retrieve the corresponding script and send it to the SES.

The web application can also generate instructions based on the user's interactions with the UI. For example, the UI can include a navigation structure that allows users to navigate to or select specific servers. A user can select a command or upload a script in a part of the UI that corresponds to a specific server. The web application can insert an identifier of the selected server into the instructions so that the SES can construct an object parameter corresponding to the correct server.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for utilizing non-serializable object parameters with a function as a service ("FaaS") platform. A user can select, in a user interface of a web application, a server and a command for executing in a shell client. The web application can generate instructions for constructing an object in a shell client where the object represents the server as a parameter in a shell script. The web application can retrieve a shell script associated with the selected command. The web application can send the instructions and shell script to a FaaS. The FaaS can execute, in a shell client, a script that constructs the object as a parameter in a shell session. In the same shell session, the FaaS can execute the shell script, causing the shell client to use the object as a parameter for the shell script.

Figure 1:
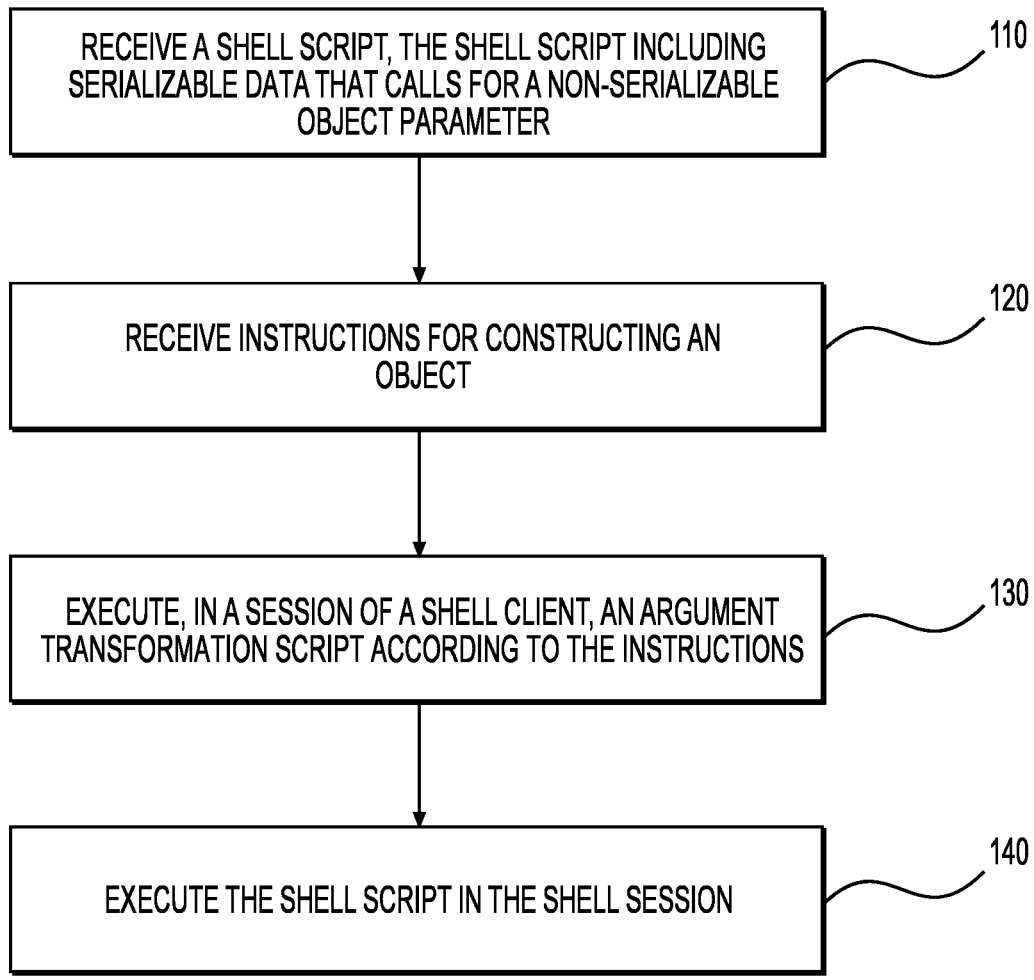
FIG. 1 is a flowchart of an example method for utilizing non-serializable objects with a FaaS platform.

FIG. 1 is a flowchart of an example method for pas utilizing sing non-serializable parameters with a function as a service ("FaaS") in a serverless computing environment. At stage 110, a script execution service ("SES") can receive a shell script that includes serializable data that calls for a non-serializable object parameter. The SES can be a FaaS platform in a cloud-based computing environment, such as a serverless computing environment. The SES can be configured to allow user devices to run shell scripts for a remote operating system without the need to have a shell client installed on the user device.

In an example, the SES can also include a shell client. The shell client of the SES can be an object-oriented interface for accessing an operating system's services. The shell client can be built on .NET framework, such as .NET Core. In an example, the shell client can be a PowerShell client or a PowerShell-based client, such as POWERCLI. In another example, the shell client can be LINUX or MACOS based, such as POWERSHELL CORE. PowerShell-based clients that run on .NET framework can run a specialized class of commands that output results as objects. Objects can also be used as inputs, such as a parameter.

In an example, the SES can include an application programming interface ("API"). The API can communicate with a web application that allows users to manage servers in a system, such as an enterprise system. The web application can include an interface that allows a user to input an executable shell script, which the web application can send to the SES API. Because the SES is not located on the user device, the user's script must be serialized to be transmitted to the SES API. This prohibits the script from including objects as input parameters.

To solve this problem, the SES can be configured to construct the object parameters for the shell script. For example, at stage 120, the web application can send instructions for constructing an object parameter to the SES API. In an example, the instructions can include an argument transformation script, which can be a script that produces an object as a parameter when executed in a shell client. The following is an example of instructions for constructing an object in JavaScript Object Notation "(JSON") format:

"parameter": {
"name": "VM",
"argument-transformation": "Get-VM-Name 'VM1'"
}

In the example above, "parameter" instructs the SES to perform the steps for generating an object and inserting the object into the shell script. "'Name':'VM'" instructs the SES what to name the object. The object name can be based on text in the shell script used for the parameter. "'Argument-transformation':'Get-VM-Name 'VM1''" instructs the SES to run "Get-VM-Name 'VM1'" to generate the object. In an example, the SES can be configured to interpret these instructions to run the command "$vm=Get-VM-Name 'VM1'" in the shell client, which will cause the shell client to construct an object for VM1 and name it '$vm.'

Although the SES can be configured to communicate with the web application to run the argument transformation script, in some examples the web application can include a tool that allows a user to provide instructions to the SES. In one example, the command can be typed into a text box. For example, the SES can be configured for representational state transfer (REST) architecture. In an example, if the user knows the name of the object, the user can provide a REST command like below:

POST/api/argument-transformation/get-vm-by-name
{
"vm-name":"VM1"
}

Upon receiving this command, the SES can be configured to run "Get-VM-Name 'VM1'" in the shell client to generate an object for VM1.

At stage 130, the SES can execute the argument transformation script in the shell client. For example, the SES can launch the shell client. The SES can launch the shell based on receiving the argument or user authentication information, in an example. Launching the shell client can cause a shell session to begin. By executing the argument transformation script, the shell client can query the server for data necessary to construct the object. In an example, the query can be made over HTTP or another web protocol. The shell client can receive the data and construct the object.

At stage 140, the SES can execute the shell script in the shell client. Because objects are not serializable, the SES can execute the shell script in the same session runtime as the argument transformation script. By doing so, the shell script can be executed with the object as a parameter.

In an example of the above described method, the SES can be installed on a VM management server that hosts multiple VMs. The web application interface can provide a navigation menu or tree that allows a user to select one of the available VMs. The web application can determine the object parameter based on where the VM selected by the user. For example, a user can navigate to a VM called "VM1" and input a shell script for VM1. Because the user provided the shell script in the portion of the interface for VM1, the web application can send instructions to the SES for constructing an object for VM1. As an example, the instructions can cause the SES to run the argument transformation script "Get-VM-Name 'VM1'" before running the shell script in a shell client.

In one example, a system can include multiple VM management servers, and each VM management server can include an SES. The web application can have access to a table that maps each VM in the interface to its corresponding VM management server. When a user provides a shell script for a VM, the web application can access the table to identify which VM management server is hosting that VM. The web application can then send the shell script with the appropriate argument transformation instructions the SES on the corresponding server.

In an example, the web application can include a set of pre-scripted commands that a user can choose from instead of the user providing the script. This can allow users who are not familiar with the scripting language to utilize the service. As an example, the web application can provide a user interface ("UI") that allows users to select a device. Some examples of a device can include a server or a VM. In an example, the UI can display a tree structure for navigating to servers in a system. When a user selects a server, the UI can provide a list of commands that can be executed for that server. Each command can be mapped to a shell script. When a user selects a command, the web application can retrieve the corresponding shell script.

In an example, the shell script can be stored in a library of scripts that the web application has access to, such as a network database or on the web server. The library can include scripts at least for each command available in the web application. In an example, commands and their corresponding scripts can be configured by an administrator.

In an example, the web application can use the user selections to generate the instructions for constructing the object. For example, each server can have an identifier ("server ID") and the web application can include an instructions template. When a user selects a command for a server, the web application can insert the server ID into the instructions template. In one example, the instructions can include a label to give the constructed object. The web application can ensure that the label matches the object name in the script. If these do not match, then the shell client may be unable to execute the script.

As an example, the web application can use the example template below to generate instructions in JSON format:

"parameter": {
"name": "objectname",
"argument-transformation": "Get-VM-Name serverID"
}

In this example template, objectname is a placeholder for the name for the object parameter in the script and serverID is a placeholder for the server ID. A user selects a command for a VM with the server ID "VM01," so the web application replaces "serverID" with "VM01." The script for the selected command names the parameter "VMcommand," so the web application replaces "objectname" with "VMcommand."

In an example that uses the instructions template above, the web application can include an option to delete a VM. A user navigates to a VM in the UI and selects the delete option. The web application inserts "VM01" as the "serverID" in the instruction template. The web application retrieves the command script for VM deletion. In this system, the script for executing the VM deletion command is ". \MyRemoveVM.ps1-VM $vmdelete" where MyRemoveVM.ps1 is a command that causes a shell client to delete the VM associated with the object parameter $vmdelete. The web application identifies $vmdelete as the object name and inserts it into the instructions in place of "objectname." Using this information, the web application generates the instructions below in JSON format.

"parameter": {
"name": "$vmdelete",
"argument-transformation": "Get-VM-Name 'VM01'"
}

The web application can send these instructions and the script to the SES API. Upon receiving the instructions and script, the SES can first follow the instructions for generating the object. In one example, the SES can execute the argument transformation command "$vmdelete=Get-VM-Name 'VM1'" in the shell client based on the instructions to generate the object parameter. Once the object parameter is loaded into the shell session, the SES can execute ".\MyRemoveVM.ps1-VM $vmdelete" in the shell client. This can cause the server "$vmdelete" to be deleted.

In an example, the script retrieval can take place at the SES. For example, the web application can receive a server selection and command from a user. The web application can send the server's ID and a command identifier ("command ID") to the SES. The SES can include templates for object construction and a library of scripts. The command IDs from the web application can be mapped to specific scripts. The SES can insert the server ID into the template and execute it in the shell client to generate an object for the server. The SES can map the command ID to its corresponding script and execute the script after the object is constructed in the session.

Figure 2:
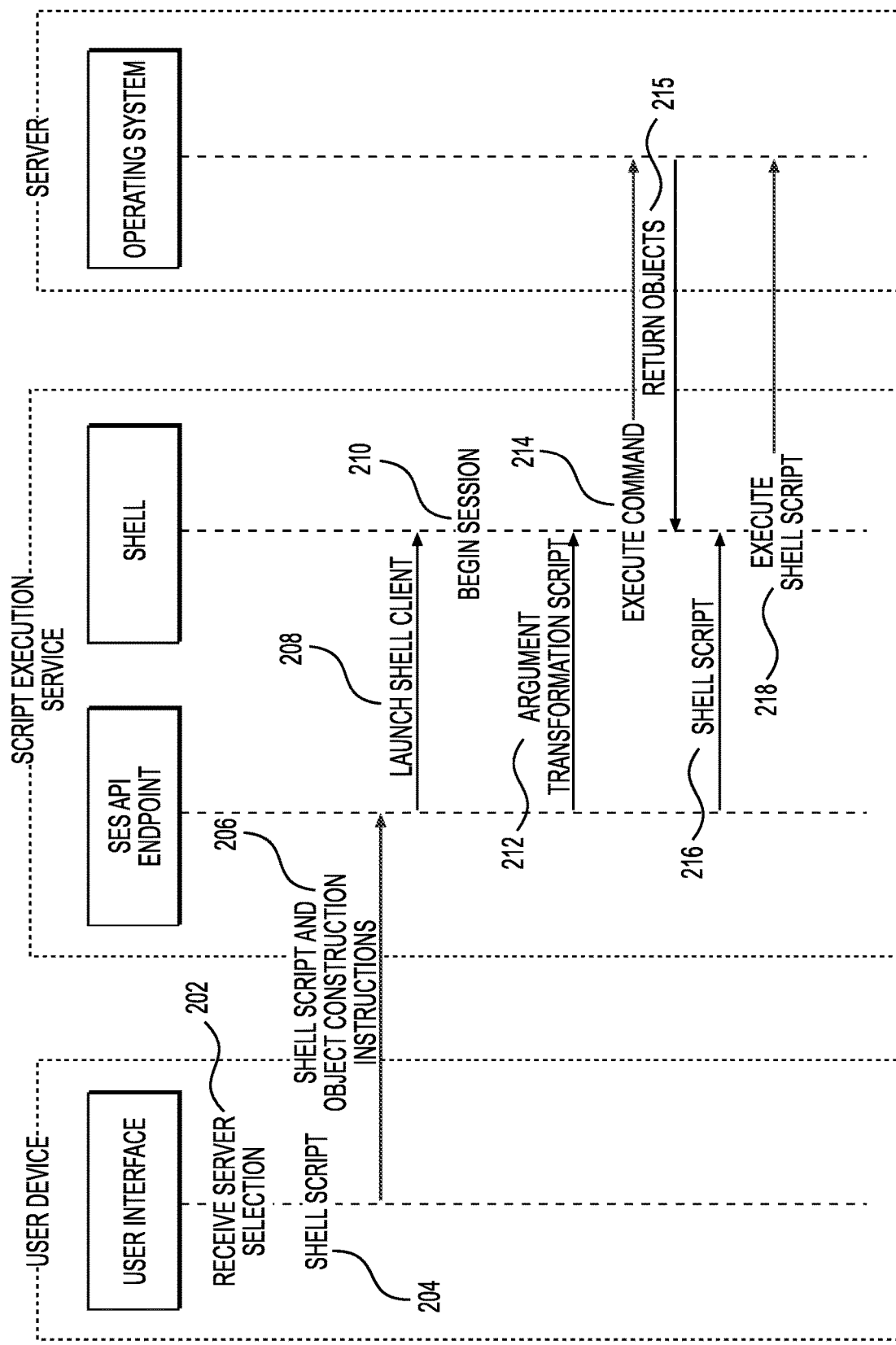
FIG. 2 is a sequence diagram of an example method for utilizing non-serializable objects with a FaaS platform.

FIG. 2 is a sequence diagram of an example method for utilizing non-serializable parameters with a shell client FaaS. At stage 202, a user can select a server in a user interface. The UI can be part of a web application accessible through a web browser. The web application interface can provide a navigation menu or tree that allows a user to select a server. The server can be a physical or a virtual server. In one example, the selected server can be a VM hosted in a cloud-based environment, such as a serverless computing environment. The cloud-based environment can include physical servers that can each host multiple machines. Regardless of the system configuration, the web application can provide an interface whereby a user can select a server and enter a shell script for the server.

At stage 204, the user can provide a script to the user interface. The script can be a shell script that is executable by a shell client. In an example, the shell client can be a PowerShell client or a PowerShell-based client, such as POWERCLI. In another example, the shell client can be LINUX or MACOS based, such as POWERSHELL CORE. In an example, the shell client can run on .NET framework can run a specialized class of commands that output results as objects. The user can provide the script as if the shell client were located on the user device. The script can be typed by the user or selected from pre-made scripts, in an example.

At stage 206, the web application can send the script to an SES API endpoint. Where the script call for an object as a parameter, only the serializable text that represents the object parameter will be sent. As an example, a user provides a shell script that includes '$VM1' that represents an object parameter for a VM named 'VM1.' If run on a shell client on the user device, '$VM1' would be treated as an object rather than serializable text. However, because the shell script is being transmitted from the user device to the SES API, the object represented by $VM1' cannot be sent as an object. Instead, the web application sends the shell script with '$VM1' as text that can be used later for constructing the object parameter.

The web application can also send instructions for constructing the object parameter at stage 206. The instructions can indicate what command the SES API should run in the shell client to produce the object, and what to name the object. In an example, the web application can know what object to construct and the name based on the selected server. For example, if the user selects a server named "VM1" and the script uses "VM" as the parameter, then the SES can run a command that retrieves information to construct an object for "VM1" and name it "VM." Then when the user's script is executed, the object is already loaded into the session under the same identifier in the script, thus allowing the user's script to successfully execute.

At stage 208, the SES API endpoint can launch a shell client. The shell client can be an object-oriented interface for accessing an operating system's services. The shell client can be built on .NET framework, such as .NET Core. In an example, the shell client can be a PowerShell client or a PowerShell-based client, such as POWERCLI. In another example, the shell client can be LINUX or MACOS based, such as POWERSHELL CORE. PowerShell-based clients that run on .NET framework can run a specialized class of commands that output results as objects. At stage 210, when the shell client launches, it can initialize a shell session.

At stage 212, the SES API endpoint can provide an argument transformation script in the shell client, and the shell client can execute the argument transformation script at stage 214. This can be done as part of the instructions from the web application. Executing the argument transformation script can cause the shell client to query the server's operating system for data relating to the object. At stage 215, the operating system can return the data, which the shell client can use to construct the object. Once the object is constructed, it exists in the shell session and can be used by subsequent scripts so long as the scripts are executed in the same session.

At stage 216, the SES API can provide the script to the shell client, and the shell client can execute the script at stage 218. It is important that the script be executed in the same shell session runtime so that the shell client can use the constructed object as a parameter.

Figure 3:
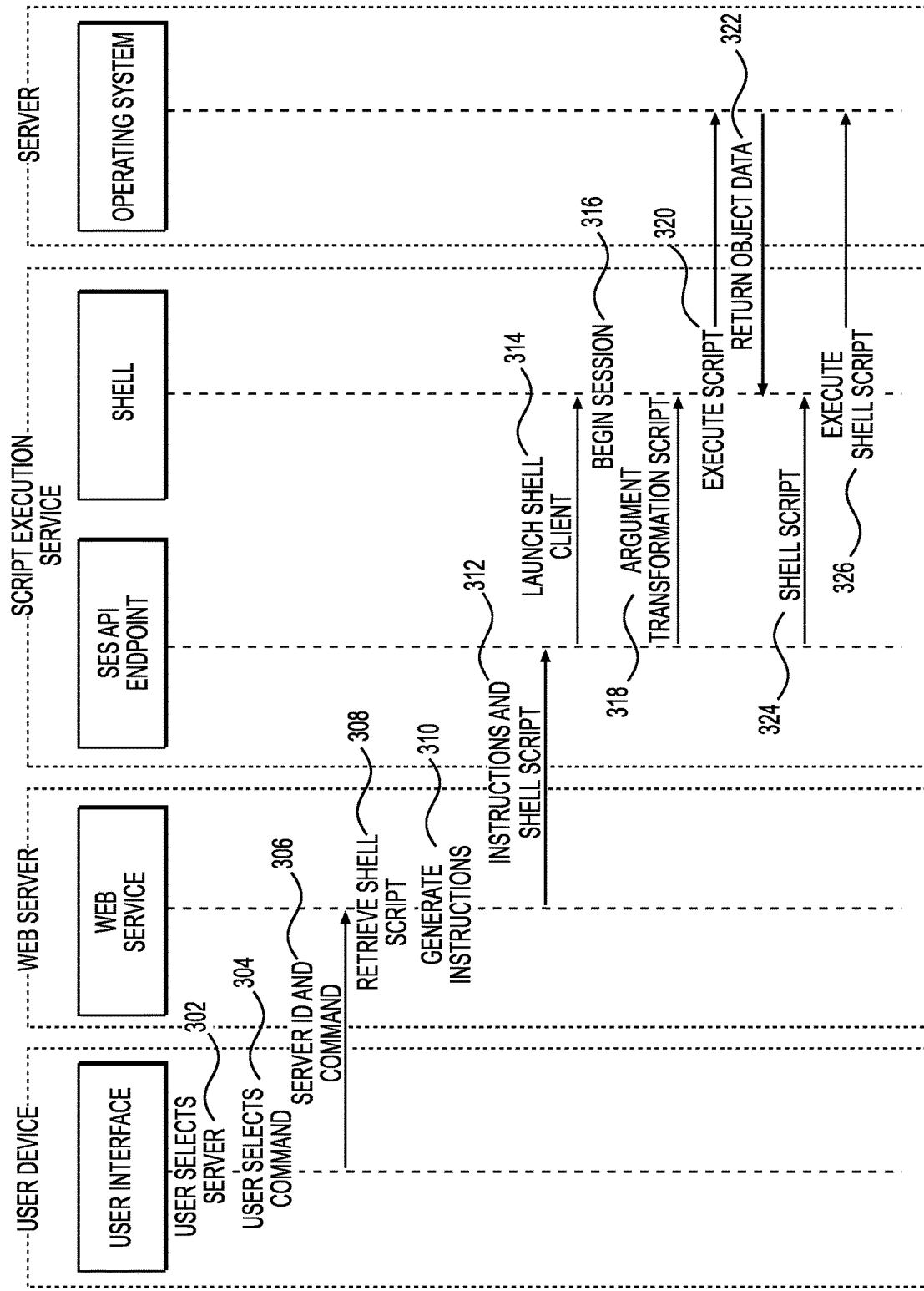
FIG. 3 is another sequence diagram of an example method for utilizing non-serializable objects with a FaaS platform.

FIG. 3 is sequence diagram of an example method for utilizing non-serializable objects with a FaaS platform where a shell script is automatically generated based on a user selecting a command. At stage 302, a user can select a server in the UI of a web application. The web application can be provided by a web application on a web server. As an example, the user can access the web application by inputting the Uniform Resource Locator (URL) associated with the web application in a web browser. This can cause a web page to load with the UI of the web application. The UI can provide a navigation menu or tree that allows a user to navigate through various servers or other devices in a system, such as an enterprise system. The servers can be physical or virtual servers. In one example, the servers can be part of a serverless computing environment. Each server can have a server ID that serves as a unique identifier.

In an example, when a user selects a server, the web application can present details about the server and provide a list of commands relating to the server that can be executed. Some example commands can include deleting, restarting, or shutting down the server. In one example where the server is a VM, web application can provide an option for duplicating the server. At stage 304, the user can select a command.

After a command is selected, the user device can send the server ID and command selection to the web server at stage 308. In an example, each command option can be mapped to an executable shell script. For example, each command option can have a command ID, and the web server can store a table that matches each command ID to its corresponding script. The user device can send the command ID to the web server, and the web server can use the command ID to retrieve the corresponding script. As an example, the UI can include an option to delete a VM. The delete command option can be mapped to a script that reads ".\MyRemoveVM.ps1-VM $vmdelete" where MyRemoveVM.ps1 is a command that causes a shell client to delete the VM. The web server can retrieve this script to send to the SES.

At stage 310, the web server can generate instructions. The instructions can include information on how to create object parameters for the script. The instructions can be in any serializable format suitable for transmitting over a network, such as the Internet or a Local Area Network (LAN). As some examples, the instructions can be in JSON or Extensible Markup Language (XML). In an example, the instructions can tell the SES what script to run to generate an object for the selected server and what to name the object. In one example, the object generation script can be an argument transformation script, which can be any script that produces objects for parameters. In some examples, the argument transformation script can be specific to the shell client. For example, an enterprise can provide its own shell client built on PowerShell. The enterprise shell client can include libraries of additional commands beyond what is provided in PowerShell. One example of such an enterprise shell client is POWERCLI by VMWARE.

Stages 308 and 310 do not need to be performed in that order. For example, the web server can generate the instructions before it retrieves the shell script or concurrently with receiving the shell script.

At stage 312, the web server can send the instructions and shell script to the SES API endpoint. In one example, the web server can send the instructions and shell script using an HTTP API or other protocol. In one example, the web server can send the instructions and command ID to the SES API endpoint at stage 312, and the SES API endpoint can retrieve the shell script instead of the web application. For example, the SES can include a storage component with a library of shell scripts for the selectable commands. The SES can receive the command ID from the web application and retrieve the shell script from the libraries.

At stage 314, the SES API endpoint can launch the shell client. The shell client can be an object-oriented interface for accessing an operating system's services. The shell client can be built on .NET framework, such as .NET Core. In an example, the shell client can be a PowerShell client or a PowerShell-based client, such those described above.

At stage 316, when the shell client launches, it can cause a shell session to begin. In a shell session, script results can remain available unless the session closes or another script removes them. For example, if the output for a script is an object, that object can remain available while the session is open. If the session closes the object may no longer be available.

At stage 318, the SES API endpoint can provide an argument transformation script in the shell client, and the shell client can execute the argument transformation script at stage 320. This can be done as part of the instructions from the web server. Executing the argument transformation script can cause the shell client to query the server's operating system for data relating to the object. The operating system can return the data at stage 322, which the shell client can use to construct the object. In one example, the operating system can be part of a VM hosted on the server, and the object parameter can be a parameter for the VM.

With the object constructed in the session, at stage 324, the SES API endpoint can provide the shell script to the shell client, and the shell client can execute the script at stage 326. It is important that the script be executed in the same shell session so that the object can be used as a parameter.

In one example, stages 314, 318, and 324 can be executed by an SES engine that is part of the SES. For example, the SES engine can retrieve the instructions and script from the SES API endpoint. The SES engine can then launch the shell client and execute the argument transformation script to construct the object in the shell session. The SES engine can then execute the shell script in the shell client.

Figure 4:
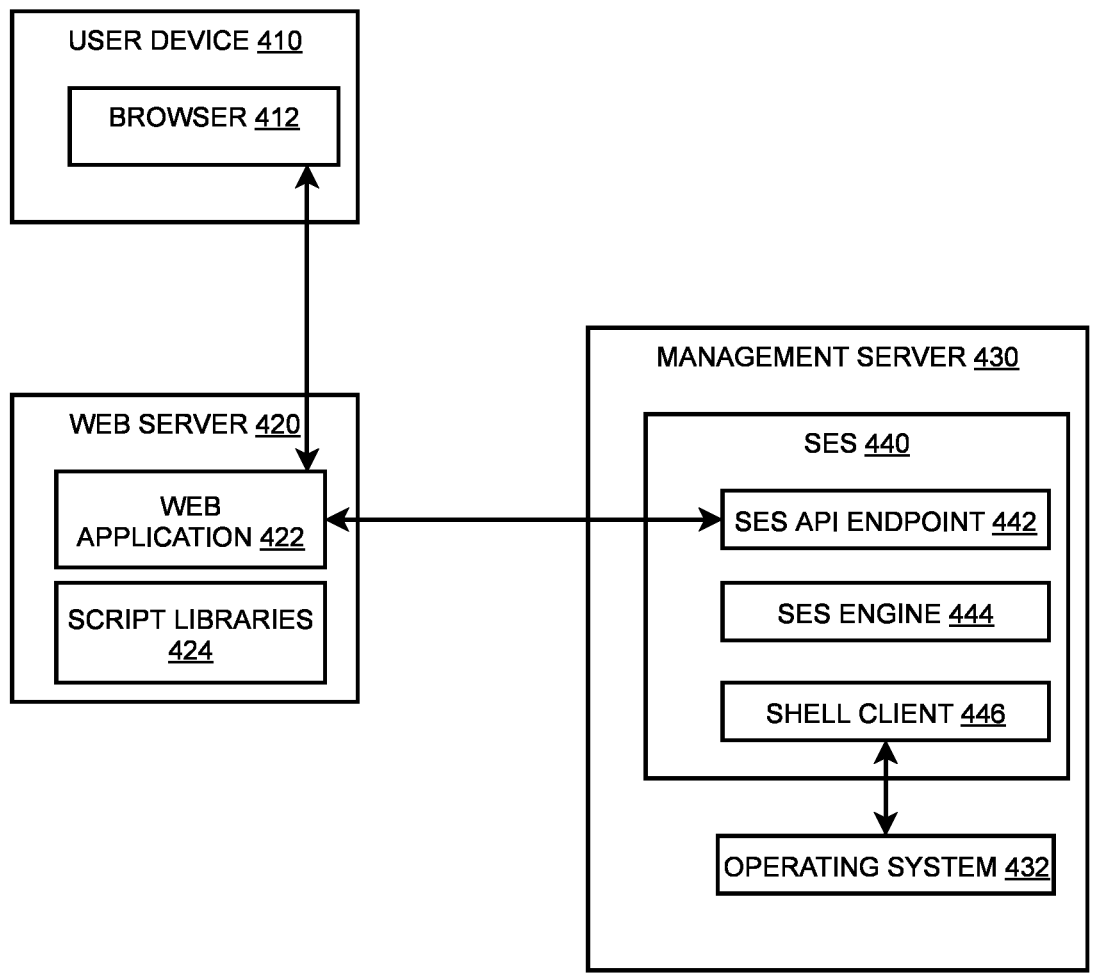
FIG. 4 is an illustration of an example system for utilizing non-serializable objects with a FaaS platform.

FIG. 4 is an illustration of an example system for utilizing non-serializable parameters with a FaaS in a serverless computing environment. The system can include a user device 410, a web server, 420, and a management server 430. The user device can be one or more processor-based devices, such as a personal computer, tablet, or cell phone. The user device 410 can include a browser 412. The browser 412 can be any kind of web browser used for accessing online content. As some examples, the browser 412 can be GOOGLE CHROME, MICROSOFT EDGE, or SAFARI.

The web server 420 can be a single server or a group of servers, including multiple servers implemented virtually across multiple computing platforms. The web server can use HTTP and other protocols to respond to requests from browsers, like the browser 412, and provide website content to them. The web server 420 can include a web application 422. The web application can be a software program that is stored on the web server 420 and accessible through the browser 412.

The web application 422 can provide an interface to the browser 412 that allows users to manage operating systems 432 of servers and other devices in a system. In an example, the interface can facilitate allowing a user to perform certain actions respecting the operating systems 432. In an example, the operating system 432 can be part of a VM that is hosted on the management server 430. In some examples, the management server 430 can host multiple operating systems 432 or VMs. In one example, the interface can include a field where a user can provide a shell script that can be executed by an SES 440 on the management server 430. In another example, the interface can allow a user to select from a set of predefined commands that can be executed by the SES 440.

When a user provides a shells script or selects a command for the operating system 432, the web application 422 can be configured to generate instructions for constructing an object parameter the corresponds to the operating system 432. In examples where the user selects predefined command, the web application 422 can retrieve a script from script libraries 424. The script libraries 424 can be a storage component that stores shell scripts. The web server 420 can also include a mapping table that maps each predefined command to its corresponding script. The shell scripts can include text that represents object parameters. When an object is constructed in the shell client 446 under the same name, the text will be interpreted as a parameter by the shell client so long as the text matches the object parameter name.

In an example, the web application 422 can be configured to communicate with an SES API endpoint 442 to send the instructions and the shell script to the management server 430. The web application 422 and SES API endpoint 442 can communicate over HTTP or another web protocol.

The management server 430 can be a single server or a group of servers, including multiple servers implemented virtually across multiple computing platforms. In one example, the management server 430 can be part of an enterprise network. In another example, the management server 430 can be part of a cloud-based serverless computing environment. In one example, the management server 430 can include server management software that allows it to automate and manage virtual infrastructure, such as hypervisors and virtual machines. As an example, the management server 430 can include multiple operating systems 432, and each operating system 432 can represent a different VM.

The management server 430 can include an SES 440. In an example, the SES 440 can be a FaaS platform that executes scripts on PowerShell-based shell clients without the need to have the shell client installed on a user device. The SES 440 can include the SES API endpoint 442, an SES engine 444, and a shell client 446. As discussed above, the SES API endpoint 442 can be an API that allows other devices, like the web server 420, to communicate with the SES 440. The SES engine 444 can retrieve instructions and scripts received by the SES API endpoint 442. The SES engine 444 can also launch the shell client 446 when a script is received.

The shell client 444 can be an object-oriented interface for accessing services of the operating system 432. The shell client 444 can be built on .NET framework, such as .NET Core. In an example, the shell client can be a PowerShell client or a PowerShell-based client, such as POWERCLI. In another example, the shell client can be LINUX or MACOS based, such as POWERSHELL CORE. Shell clients 444 based on PowerShell can generate objects as outputs and use objects as input parameters.

In an example, the SES engine 444 can be configured to extract an argument transformation script from the instructions. The SES 444 can execute the argument transformation script in the shell client 446 that causes the shell client 446 to construct an object that represents the operating system 432. While the session of the shell client 446 is still active, the SES 444 can be configured to execute the shell script provided by the web server 420. Where the shell script is executed in the same shell session, the shell client 446 interprets the text in the shell script that represents the object as an object parameter. This allows shells scripts with object parameters to be passed from a user device to a FaaS.

In an example, the management server and web server can be part of an enterprise system. The enterprise system can include various VMs distributed across multiple hardware servers. In one example, each hardware server can include an SES client and the web application can be used to manage the VMs. When a user selects a command for a VM or uploads a shell script, the web server can send object construction instructions and the script to the hardware server hosting the VM.

In one example, the web application can include a feature that allows an administrator to manage commands and script libraries. For example, an administrator can add or remove scripts. When adding a script, the administrator can map the corresponding command to the script. The web application can also allow the administrator to control what commands each user has access to. For example, one set of users can have access to run a certain set of safe commands, like launching an application on a server. Another higher tiered group of users can have access to execute more impactful commands, such as deleting a server.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for utilizing non-serializable objects by a function as a service ("FaaS") platform, comprising:
   receiving a request to execute a script and instructions for constructing an object, the script including a serialized placeholder value specifying an identifier of a virtual machine ("VM");
   executing, at a shell client, an argument transformation script according to the instructions, wherein executing the argument transformation script causes the shell client to construct a non-serializable object corresponding to the VM;
   replacing, in the script, the serialized placeholder value with a serialized value specifying an identifier of the non-serializable object; and
   executing the script in the shell session, wherein the shell client uses the non-serializable object as a parameter when executing the script based on the serialized value.

2. The method of claim 1, wherein the request and instructions are received from a web application having a user interface that allows a user to select a device for the parameter.

3. The method of claim 2, wherein:
   the user interface allows a user to select a command to execute on the device, and
   in an instance where a user selects a command, a web server inserts the serialized placeholder value into the script based on the command selection.

4. The method of claim 3, wherein the constructed object corresponds to the selected device, and the script corresponds to the selected command.

5. The method of claim 1, wherein the receiving and executing stages are performed by the FaaS platform executing on a server.

6. The method of claim 5, wherein the server hosts a plurality of VMs, and the constructed object parameter corresponds to one of the plurality.

7. The method of claim 1, wherein the shell client is a PowerShell-based client.

8. A non-transitory, computer-readable medium containing instructions that, when executed by a hardware-based processor, performs stages for utilizing non-serializable objects by a function as a service ("FaaS") platform, the stages comprising:
   receiving a request to execute a script and instructions for constructing an object, the script including a serialized placeholder value specifying an identifier of a virtual machine ("VM");
   executing, at a shell client, an argument transformation script according to the instructions, wherein executing the argument transformation script causes the shell client to construct a non-serializable object corresponding to the VM;
   replacing, in the script, the serialized placeholder value with a serialized value specifying an identifier of the non-serializable object; and
   executing the script in the shell session, wherein the shell client uses the non-serializable object as a parameter when executing the script based on the serialized value.

9. The non-transitory, computer-readable medium of claim 8, wherein the request and instructions are received from a web application having a user interface that allows a user to select a device for the parameter.

10. The non-transitory, computer-readable medium of claim 9, wherein:
    the user interface allows a user to select a command to execute on the device, and
    in an instance where a user selects a command, a web server inserts the serialized placeholder value into the script based on the command selection.

11. The non-transitory, computer-readable medium of claim 10, wherein the constructed object corresponds to the selected device, and the script corresponds to the selected command.

12. The non-transitory, computer-readable medium of claim 8, wherein the receiving and executing stages are performed by the FaaS executing on a server.

13. The non-transitory, computer-readable medium of claim 8, wherein the server hosts a plurality of VMs, and the constructed object parameter corresponds to one of the plurality.

14. The non-transitory, computer-readable medium of claim 8, wherein the shell client is a PowerShell-based client.

15. A system for utilizing non-serializable objects by a function as a service ("FaaS") platform, comprising:
    a memory storage including a non-transitory, computer-readable medium comprising instructions; and
    a computing device including a hardware-based processor that executes the instructions to carry out stages comprising:
       receiving a request to execute a script and instructions for constructing an object, the script including a serialized placeholder value specifying an identifier of a virtual machine ("VM")
       executing, at a shell client, an argument transformation script according to the instructions, wherein executing the argument transformation script causes the shell client to construct a non-serializable object corresponding to the VM;
       replacing, in the script, the serialized placeholder value with a serialized value specifying an identifier of the non-serializable object; and
       executing the script in the shell session, wherein the shell client uses the non-serializable object as a parameter when executing the script based on the serialized value.

16. The system of claim 15, wherein the request and instructions are received from a web application having a user interface that allows a user to select a device for the parameter.

17. The system of claim 16, wherein
    the user interface allows a user to select a command to execute on the device, and
    in an instance where a user selects a command, a web server inserts the serialized placeholder value into the script based on the command selection.

18. The system of claim 17, wherein the constructed object corresponds to the selected device, and the script corresponds to the selected command.

19. The system of claim 15, wherein the receiving and executing stages are performed by the FaaS executing on a server.

20. The system of claim 19, wherein the server hosts a plurality of VMs, and the constructed object parameter corresponds to one of the plurality.

* * * * *